United States Patent
Kitaura et al.

(10) Patent No.: US 7,304,930 B2
(45) Date of Patent: Dec. 4, 2007

(54) OPTICAL INFORMATION RECORDING MEDIUM AND RECORDING METHOD USING THE SAME

(75) Inventors: Hideki Kitaura, Souraku-gun (JP); Noboru Yamada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 406 days.

(21) Appl. No.: 10/433,818

(22) PCT Filed: Jul. 26, 2002

(86) PCT No.: PCT/JP02/07647

§ 371 (c)(1),
(2), (4) Date: Jun. 6, 2003

(87) PCT Pub. No.: WO03/025923

PCT Pub. Date: Mar. 27, 2003

(65) Prior Publication Data
US 2004/0047264 A1    Mar. 11, 2004

(30) Foreign Application Priority Data
Sep. 12, 2001 (JP) .............................. 2001-276283

(51) Int. Cl.
*G11B 7/00* (2006.01)
(52) U.S. Cl. .................... 369/59.11; 369/275.2
(58) Field of Classification Search .............. 369/59.11, 369/275.2
See application file for complete search history.

(56) References Cited

U.S. PATENT DOCUMENTS

| | | | |
|---|---|---|---|
| 4,661,420 A * | 4/1987 | Nakamura et al. | ........ 428/824.1 |
| 5,108,846 A | 4/1992 | Steininger | |
| 5,802,032 A | 9/1998 | Jacobs et al. | |
| 6,576,319 B2 * | 6/2003 | Yoshinari et al. | ........... 428/64.1 |
| 6,751,184 B2 * | 6/2004 | Kojima et al. | ............ 369/275.2 |
| 2001/0009708 A1 | 7/2001 | Kikukawa et al. | |
| 2001/0041304 A1 | 11/2001 | Uno et al. | |

FOREIGN PATENT DOCUMENTS

EP        0 980 068        2/2000

(Continued)

OTHER PUBLICATIONS

JP 2002-298433 Translation Nov. 10, 2002 Japan Yuzusu Keiichoro.*

*Primary Examiner*—Wayne Young
*Assistant Examiner*—Van T. Pham
(74) *Attorney, Agent, or Firm*—Hamre, Schumann, Mueller & Larson, P.C.

(57) ABSTRACT

An optical information recording medium 10 includes a first substrate 11, a second substrate 12 disposed in parallel with the first substrate 11, and an information layer 20 disposed between the first substrate 11 and the second substrate 12, and the information layer 20 includes a recording layer 23 and inorganic layers (lower side interface layer 22 and upper side interface layer 24) adjacent to the recording layer 23. The recording layer 23 is changed between at least two different states, which are discernable optically, by irradiation with a laser beam 14 incident from the first substrate 11 side. The inorganic layer contains a nitride of $Si_xGe_{1-x}$ (where $0.3 \leq x \leq 0.9$) as a main component. The present invention provides an optical information recording medium capable of recording/reproducing information with satisfactory reliability even in recording/reproducing with a light beam having a short wavelength or in recording/reproducing with respect to a plurality of information layers.

8 Claims, 4 Drawing Sheets

FOREIGN PATENT DOCUMENTS

| | | |
|---|---|---|
| EP | 1 011 101 | 6/2000 |
| JP | 62-53886 | 3/1987 |
| JP | 62-291727 | 12/1987 |
| JP | 63-176185 | 7/1988 |
| JP | 1-191330 | 8/1989 |
| JP | 2-147289 | 6/1990 |
| JP | 5-101443 | 4/1993 |
| JP | 5-185733 | 7/1993 |
| JP | 5-217211 | 8/1993 |
| JP | 5-242539 | 9/1993 |
| JP | 5242539 * | 9/1993 |
| JP | 9-156223 | 6/1997 |
| JP | 9-212917 | 8/1997 |
| JP | 9-263055 | 10/1997 |
| JP | 11-115315 | 4/1999 |
| JP | 11-157215 | 6/1999 |
| JP | 11-339311 | 12/1999 |
| JP | 2000-36130 | 2/2000 |
| JP | 2000-137916 | 5/2000 |
| JP | 2001-28148 | 1/2001 |
| JP | 2002-298433 | 10/2002 |
| WO | 96/31875 | 10/1996 |
| WO | 97/34298 | 9/1997 |

\* cited by examiner

OPTICAL INFORMATION RECORDING MEDIUM AND RECORDING METHOD USING THE SAME

TECHNICAL FIELD

The present invention relates to an optical information recording medium capable of recording/reproducing an information signal by irradiation with a light beam such as a laser beam and a recording method using the same.

BACKGROUND ART

Conventionally, it is known that a thin film made of a chalcogen material or the like formed on a substrate is locally heated by irradiation with laser light, whereby a phase can be changed between an amorphous phase and a crystal phase having different optical constants (refractive index n, extinction coefficient k), using different irradiation conditions. A so-called phase-change type optical information recording medium using the above phenomenon is being studied and developed actively. In the phase-change type optical information recording medium, an information track of the recording medium is irradiated with a laser beam whose output is modulated between two power levels: a recording level and an erasure level, whereby a new signal can be recorded while a previous signal is being erased. Generally, in such a recording medium, a multi-layer film including layers other than a recording layer is used as an information layer for recording information. For example, a multi-layer film including a protection layer made of a dielectric material or a reflection layer made of metal can be used as the information layer.

The protection layer made of a dielectric material has, for example, the following functions of (1) protecting a recording layer from mechanical damage from outside;

(2) reducing thermal damage occurring in the case where a signal is rewritten repeatedly to increase the rewritable number of times;

(3) enhancing the change in optical characteristics by using an interference effect due to multi-reflection; and (4) preventing a chemical change due to the influence of outside air.

As a material for the protection layer achieving the above-mentioned objects, conventionally, an oxide such as $Al_2O_3$, $TiO_2$ and $SiO_2$; a nitride such as $Si_3N_4$ and AlN; an oxynitride such as Si—O—N; a sulfide such as ZnS; and a carbide such as SiC are proposed. Furthermore, as the material for the protection layer, a material such as ZnS—$SiO_2$ that is a mixture of ZnS and $SiO_2$ also is proposed. Among these materials, ZnS—$SiO_2$ has a considerably small thermal conductivity among the dielectrics, and can minimize the heat diffusion occurring during recording with a laser beam. Therefore, the recording sensitivity is enhanced by using ZnS—$SiO_2$. Furthermore, due to a small internal stress, even when this material is formed into a thick film, cracking is unlikely to occur. This material has high adhesion with respect to a phase-change material layer, so that the film made of such a material is unlikely to peel off even after repeated laser irradiation. For these reasons, ZnS—$SiO_2$ mostly is used as the material for the protection layer.

Furthermore, an interface layer between a recording layer and a dielectric layer is proposed. The interface layer has, for example, the following functions of:

(1) promoting the crystallization of the recording layer to enhance erasure characteristics; and (2) preventing mutual diffusion between the recording layer and the protection layer (dielectric layer) and enhance durability in repeated recording. The interface layer also needs to have characteristics in which corrosion and peeling from the recording layer are not likely to occur.

As the material for such an interface layer, for example, a nitride of Si or Ge is disclosed (see JP 5(1993)-217211 A and WO 97/34298). These materials are very excellent in the above-mentioned crystal core generation promoting effect and diffusion preventing effect. However, it is reported that due to the insufficient adhesion with respect to the recording layer, the interface layer made of Si—N peels off under high-temperature and high-humidity conditions, and thus, the reliability during long-term use is low (see WO 97/34298). In contrast, an interface layer containing Ge—N as its main component is unlikely to peel off even under high-temperature and high-humidity conditions, and thus, Ge—N is one of the most suitable materials for the interface layer. WO 97/34298 shows that Cr or the like is effective as an additive to Ge—N in terms of moisture resistance. Si also is listed as an example of an additive. However, WO 97/34298 does not disclose the amount of Si added to Ge—N and specific effects obtained by adding Si.

In the above-mentioned recording medium, as basic means for increasing the amount of information that can be accumulated in one medium, there is a method for shortening the wavelength of laser light or increasing the numerical aperture of an objective lens condensing the laser light, thereby decreasing the spot diameter of laser light and increasing the density of a recording surface. Furthermore, in order to increase the recording density in a circumferential direction, mark edge recording is introduced in which the length of a recording mark is information. Furthermore, land and groove recording is introduced in which information is recorded on grooves for guiding laser light and lands between the grooves, so as to increase the recording density in a radial direction. Furthermore, the recording density can be increased even by using a plurality of recording layers. A recording medium including a plurality of recording layers and a recording/reproducing method thereof have already been disclosed (see JP 9(1997)-212917 A, WO 96/31875, JP 2000-36130 A). Furthermore, layer recognizing means and layer switching means are disclosed for recording/reproducing information by selecting one recording layer from a plurality of recording layers (see WO 96/31875).

In a recording medium (multi-layer recording medium) including a plurality of information layers, an information layer closer to a laser light source absorbs light. Therefore, an information layer far from the laser light source records/reproduces information with attenuated laser light. This causes a decrease in sensitivity during recording and a decrease in reflectance and amplitude during reproducing. Thus, in the multi-layer recording medium, in order to obtain sufficient recording/reproducing characteristics with a limited laser power, it is required that the transmittance of the information layer closer to the laser light source is increased, and the reflectance, difference in reflectance (difference in reflectance between a crystal phase and an amorphous phase) and sensitivity of the information layer far from the laser light source are increased.

Recently, a violet laser diode having a wavelength in the vicinity of 400 nm is being put into practical use. Then, an attempt is made to increase the density of a recording surface by applying the laser diode to a light source of a recording apparatus for an optical information recording medium. However, the spot diameter of a laser beam is decreased as the wavelength becomes shorter, and hence, the energy density of the laser beam is increased. Because of this, each layer of the information layers is likely to be thermally damaged during recording. Consequently, in the case of a number of repeated recordings, recording/reproducing characteristics are likely to be degraded. Furthermore, in general, the light absorption of the dielectric material is increased and the transmittance thereof is decreased as the wavelength becomes shorter. Therefore, when the wavelength of a laser beam is short, for example, the transmittance of an information layer in the multi-layer recording medium closer to a laser light source is decreased, and a laser beam with a sufficient power cannot reach the information layer far from the laser light source. Furthermore, since the light absorption is increased in the interface layer, the light absorption in the recording layer is decreased, which results in a decrease in recording sensitivity.

In the case of using an interface layer containing the above-mentioned Ge—N as a main component, characteristics hardly are degraded even when recording is repeated a number of times in recording/reproducing using a laser diode with a red wavelength. Furthermore, the extinction coefficient k of the interface layer at a red wavelength is small (i.e., 0.05 or less), whereby a high transmittance can be ensured. However, the interface layer is likely to be thermally damaged as described above at a violet wavelength. Therefore, the interface layer is degraded due to repeated recording. Furthermore, the extinction coefficient k at a violet wavelength is large (i.e., about 0.2), which makes it difficult to ensure a high transmittance.

DISCLOSURE OF INVENTION

In view of the above circumstance, the object of the present invention is to provide an optical information recording medium capable of recording/reproducing information with high reliability even in recording/reproducing with a light beam having a short wavelength or in recording/reproducing with respect to a plurality of information layers; a producing method thereof; and a recording method thereof.

In order to achieve the above-mentioned object, an optical information recording medium of the present invention includes: a first substrate; a second substrate disposed in parallel with the first substrate; and an information layer disposed between the first substrate and the second substrate, wherein the information layer includes a recording layer and an inorganic layer adjacent to the recording layer, the recording layer is changed between at least two different states, which are discernable optically, by irradiation with a light beam incident from the first substrate side, and the inorganic layer contains a nitride of $Si_xGe_{1-x}$ (where $0.3 \leq x \leq 0.9$) as a main component. Due to high thermal stability, the inorganic layer can enhance the durability in repeated recording and the environment reliability such as moisture resistance. In particular, in the case of recording with light having a short wavelength such as a violet laser, by increasing the content of Si, i.e., setting $0.3 \leq x$, heat resistance is enhanced, and satisfactory durability in repeated recording can be obtained.

The above-mentioned recording medium further may include at least one more information layer disposed between the first substrate and the second substrate. According to this configuration, recording with particularly high density can be performed. Furthermore, due to a relatively small extinction coefficient k, the inorganic layer can enhance the transmittance and the recording sensitivity of a multi-layer recording medium. For example, the extinction coefficient k at a wavelength of 405 nm of the inorganic layer satisfying $0.3 \leq x$ can be set to be 0.15 or less.

In the above-mentioned recording medium, the recording layer may be changed reversibly between the at least two different states, which are discernable optically, by irradiation with the light beam.

In the above-mentioned recording medium, a wavelength of the light beam may be 500 nm or less.

In the above-mentioned recording medium, the information layer may include a reflection layer disposed on the second substrate side with respect to the recording layer.

In the above-mentioned recording medium, the recording layer may be made of an alloy containing Te and Sb.

In the above-mentioned recording medium, a thickness of the recording layer may be 18 nm or less.

In the above-mentioned recording medium, the recording layer may be made of a Ge—Sb—Te based alloy, a Ge—Sn—Sb—Te based alloy, an Ag—In—Sb—Te based alloy or an Ag—In—Ge—Sb—Te based alloy.

In the above-mentioned recording medium, the recording layer may be made of a Ge—Sb—Te based alloy, and the alloy may contain Ge in a content of 30 atomic % or more.

In the above-mentioned recording medium, the recording layer may be made of a Ge—Sn—Sb—Te based alloy, and the alloy may contain Ge and Sn in a content of 30 atomic % or more in total.

Furthermore, in a first method for recording information onto an optical information recording medium including a recording layer and an inorganic layer adjacent to the recording layer, the inorganic layer contains a nitride of $Si_xGe_{1-x}$ (where $0.3 \leq x \leq 0.9$) as a main component. When the recording layer is irradiated with pulse light modulated between a power level P1 and a power level P3 smaller than the power level P1 to be changed to a state having different optical characteristics, thereby forming a recording mark, the number of pulses of the pulse light is increased as the recording mark is longer, and a value of P3/P1 is increased as a linear velocity of the optical information recording medium is higher.

Furthermore, in a second method for recording information with respect to an optical information recording medium including a recording layer and an inorganic layer adjacent to the recording layer, the inorganic layer contains a nitride of $Si_xGe_{1-x}$ (where $0.3 \leq x \leq 0.9$) as a main component. When the recording layer is irradiated with pulse light modulated between a power level P1 and a power level P3 smaller than the power level P1 to be changed to a state having different optical characteristics, thereby forming a recording mark, the number of pulses of the pulse light is increased as the recording mark is longer. When the recording mark is erased by irradiating the recording mark with continuous light of a power level P2 between the power level P1 and the power level P3, a value of P3/P2 is increased as a linear velocity of the optical information recording medium is higher. According to the first and second recording methods, even in the case where a recording medium is stored under high-temperature and high-humidity conditions, a decrease in a signal amplitude of a recording mark and difficulty in erasing a recording mark can be prevented.

BEST MODE FOR CARRYING OUT THE INVENTION

Hereinafter, the present invention will be described specifically by way of embodiments with reference to the drawings.

Embodiment 1

Figure 1:
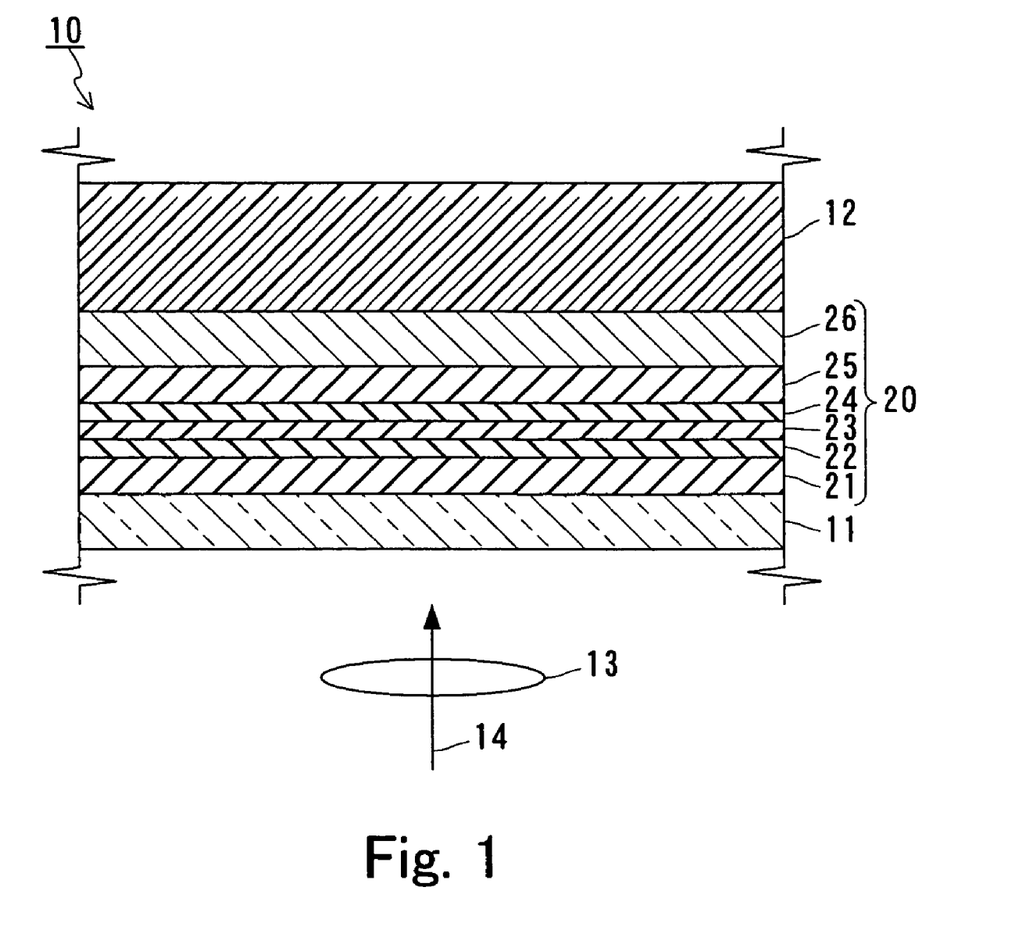
FIG. 1 is a partial cross-sectional view showing an example of an optical information recording medium of the present invention.

In Embodiment 1, an example of an optical information recording medium of the present invention will be described. FIG. 1 shows a partial cross-sectional view of an optical information recording medium 10 (hereinafter, which may be referred to as a recording medium 10) of Embodiment 1.

As shown in FIG. 1, a recording medium 10 includes a first substrate 11, a second substrate 12 placed in parallel with the first substrate 11, and an information layer 20 placed between the first substrate 11 and the second substrate 12. In the recording medium 10, information is recorded and reproduced with a laser beam 14 incident from the first substrate 11 side through an objective lens 13. The wavelength of the laser beam 14 is, for example, in a range of 300 µm to 900 µm, and preferably is 500 µm or less for high-density recording.

Information is recorded on the information layer 20. The information layer 20 is a multi-layer film in which a plurality of layers are stacked. The information layer 20 may include a lower side dielectric layer 21, a lower side interface layer 22, a recording layer 23, an upper side interface layer 24, an upper side dielectric layer 25 and a reflection layer 26 placed in this order from the first substrate 11 side. The term "lower side" refers to the first substrate 11 side with respect to the recording layer 23. The lower side interface layer 22 and the upper side interface layer 24 are both inorganic layers.

The recording medium 10 shown in FIG. 1 is an example, and may have another configuration in some cases. For example, the lower side interface layer 22 also can function as the lower side dielectric layer 21, and the upper side interface layer 24 also can function as the upper side dielectric layer 25. Therefore, the lower side dielectric layer 21 and/or the upper side dielectric layer 25 can be omitted. Furthermore, the reflection layer 26 can be omitted. Furthermore, the reflection layer 26 may be composed of a combination of a plurality of layers. Furthermore, either one of the lower side interface layer 22 and the upper side interface layer 24 can be omitted.

In the recording medium 10, information is recorded/reproduced with the laser beam 14 transmitted through the first substrate 11. Therefore, the material for the first substrate 11 preferably is almost transparent to the wavelength of the laser beam 14. As the material for the first substrate 11, polycarbonate resin, polymethylmethacrylate, polyolefin resin, norbornene resin, UV-curable resin, glass or an appropriate combination of these materials can be used. The first substrate 11 has a disk shape. The thickness thereof is not particularly limited, and is, for example, in a range of 0.01 mm to 1.5 mm. In order to perform high-density recording using an optical system with a high lens numerical aperture (NA), the thickness of the first substrate 11 preferably is 0.3 mm or less.

As the material for the lower side dielectric layer 21 and the upper side dielectric layer 25, for example, an oxide of an element such as Y, Ce, Ti, Zr, Nb, Ta, Co, Zn, Al, Si, Ge, Sn, Pb, Sb, Bi and Te can be used. Furthermore, a nitride of an element such as Ti, Zr, Nb, Ta, Cr, Mo, W. B, Al, Ga, In, Si, Ge, Sn and Pb also can be used. Furthermore, a carbide of an element such as Ti, Zr, Nb, Ta, Cr, Mo, W and Si also can be used. Furthermore, a sulfide such as Zn or Cd sulfide, a selenium compound or a tellurium compound also can be used. Furthermore, a fluoride such as Mg or Ca fluoride, or elemental C, elemental Si and elemental Ge also can be used. Alternatively, a mixture of these materials also can be used.

The lower side interface layer 22 and the upper side interface layer 24 are adjacent to the recording layer 23, and are made of an inorganic substance. At least one interface layer (preferably both the interface layers) selected from the lower side interface layer 22 and the upper side interface layer 24 contains a nitride of $Si_xGe_{1-x}$ (where $0.3 \leq x \leq 0.9$, preferably $0.5 \leq x \leq 0.8$) as its main component. Herein, to contain as its main component refers to containing Si, Ge and N in a ratio of 90 atomic % or more in total. The content of Si is preferably in a range of 30 atomic % to 90 atomic %, more preferably in a range of 50 atomic % to 80 atomic % so as to enhance the thermal stability and environment reliability such as moisture resistance, and decrease the extinction coefficient k to increase the transmittance. By enhancing the thermal stability of the interface layer, the durability in repeated recording can be enhanced, and by increasing the transmittance of the interface layer, the recording sensitivity of the recording medium (in particular, a multi-layer recording medium) can be increased. Furthermore, when nitrogen in the interface layer becomes insufficient, the effect of promoting the crystallization of the recording layer 23 is weakened. When nitrogen in the interface layer becomes excessive, the interface layer is likely to peel off from the recording layer 23. Therefore, it is preferable that the amount of nitrogen in the interface layer is optimized in accordance with the contents of Si and Ge. For example, it is preferable that the concentration of nitrogen is minimized in a range where an erasure ratio of 30 dB or more can be obtained. The lower side interface layer 22 and the upper side interface layer 24 preferably contain Si, Ge and N in an atomic ratio of Si:Ge:N=a:b:c (where $0.33 \leq a/(a+b) \leq 0.90$ and $0.3 \leq c/(a+b+c) \leq 0.6$, more preferably $0.50 \leq a/(a+b) \leq 0.80$ and $0.4 \leq c/(a+b+c) \leq 0.5$).

The recording layer 23 is of a rewritable type in which information can be rewritten any number of times or of a write-once type in which information can be written in an unrecorded region only once. The recording layer 22 is changed between at least two different states, which are discernable optically, by irradiation with a light beam (generally, a laser beam) incident from the first substrate 11 side. In the case where the recording layer 23 is of a rewritable type, a Te—Sb based chalcogenide thin film, for example, a Ge—Sb—Te based alloy thin film or a Ge—Sn—Sb—Te based alloy thin film can be used. Furthermore, an alloy thin film (e.g., Ag—In—Sb—Te based alloy or Ag—In—Ge—Sb—Te based alloy) in which In, Ge, Au, Ag and the like are added to a eutectic composition of Sb—Te also can be used. These materials are changed reversibly between a crystal phase and an amorphous phase by irradiation with the laser beam 14. In this case, the reflectance of a portion in a crystalline state is different from that of a portion in an amorphous state. Therefore, both the states can be discriminated by irradiation with the laser beam 14 for reproducing. Herein, the Ge—Sb—Te based alloy refers to an alloy containing Ge, Sb and Te in an amount of 90 atomic % or more in total. Similarly, the Ge—Sn—Sb—Te based alloy refers to an alloy containing Ge, Sn, Sb and Te in an amount of 90 atomic % or more in total. This also applies to the other alloys.

Among the above materials, in the case of using a Ge—Sb—Te based alloy containing Ge in an amount of 30 atomic % or more (in particular, 40 atomic % or more), or a Ge—Sn—Sb—Te based alloy containing Ge and Sn in an amount of 30 atomic % or more (in particular, 40 atomic % or more), an optical contrast between the crystal phase and the amorphous phase becomes large, whereby a large C/N ratio is obtained. On the other hand, these materials undergo a large change in volume between the crystal phase and the amorphous phase, which results in a decrease in durability with respect to repeated recording. Therefore, in the case of using these materials, it is more effective to enhance the durability with respect to repeated recording by using an interface layer containing a nitride of Si—Ge as its main component.

Furthermore, in the case where the recording layer 23 is of a rewritable type, at least one element selected from O, N, F, C, S and B may be added to a material for the recording layer 23 so as to adjust the thermal conductivity and optical constant or to enhance the heat resistance and environment reliability. These elements are added in an amount of 10 atomic % or less based on the total amount of the recording layer 23.

Furthermore, in the case where the recording layer 23 is of a rewritable type, the recording layer 23 may include a layer formed of the above-mentioned material and a crystallization promoting layer adjacent thereto.

In the case where the recording layer 23 is of a rewritable type, by setting the thickness of the recording layer 23 to be 3 nm to 20 nm, a sufficient C/N ratio (carrier to noise ratio) can be obtained. By setting the thickness of the recording layer 23 to be 3 nm or more, sufficient reflectance and reflectance change are obtained. Furthermore, by setting the thickness of the recording layer 23 to be 20 nm or less, heat diffusion in the recording layer 23 can be prevented from being increased excessively. Furthermore, in the case where the recording layer 23 is thin (for example, in the case where the thickness is 18 nm or less (in particular, 14 nm or less)), heat generated during recording is likely to diffuse in a thickness direction of the recording layer 23, whereby time for the recording layer 23 to be held in the vicinity of a crystallization temperature is shortened. As a result, an erasure ratio is decreased. Therefore, in the case where the recording layer 23 is thin, it is more effective to increase an erasure ratio by using an interface layer containing a nitride of Si—Ge as its main component.

In the case where the recording layer 23 is of a write-once type, as the material for the recording layer 23, a material containing Te, O(oxygen) and at least one element selected from Al, Si, Ti, V, Cr, Mn, Fe, Co, Ni, Cu, Zn, Ga, Ge, Zr, Nb, Mo, Ru, Rh, Pd, Ag, In, Sn, Sb, Hf, Ta, W Re, Os, Ir, Pt, Au and Bi can be used. For example, the recording layer 23 made of a material such as Te—O—Pd and Te—O—Au can be used. The recording layer 23 made of these materials is irreversibly changed from an amorphous phase to a crystal phase by irradiation with the laser beam 14 for recording. These two states can be discriminated by irradiation with the laser beam 14 for reproducing. As the element M, Pd or Au is particularly preferable since a sufficient crystallization speed and high environment reliability are obtained.

It is preferable that the content of oxygen in the write-once recording layer 23 is in a range of 25 atomic % to 60 atomic %, and the content of the element M therein is in a range of 1 atomic % to 35 atomic %. By setting the contents of oxygen and the element M in these ranges, a sufficient C/N ratio is obtained. By setting the content of an oxygen atom in the recording layer 23 to be 25 atomic % or more, the thermal conductivity of the recording layer 23 can be prevented from being increased excessively to enlarge a recording mark. Furthermore, by setting the content of an oxygen atom in the recording layer 23 to be 60 atomic % or less, the following can be prevented: the thermal conductivity of the recording layer 23 is decreased excessively, and even when a recording power is increased, a recording mark cannot be formed with a sufficient size. By setting the content of the element M in the recording layer 23 to be 1 atomic % or more, the function of promoting the growth of Te crystal during irradiation with laser light can be obtained sufficiently. As a result, the crystallization speed of the recording layer 23 can be set to be a sufficient value, and a recording mark can be formed at a high speed. Furthermore, by setting the content of the element M in the recording layer 23 to be 35 atomic % or less, a reflectance change between an amorphous phase and a crystal phase can be increased, and a C/N ratio can be increased.

Furthermore, in the case where the recording layer 23 is of a write-once type, at least one element selected from N, F, C, S and B may be added to a material for the recording layer 23 so as to adjust a thermal conductivity and an optical constant, or to enhance heat resistance and environment reliability. These elements are added in an amount of 10 atomic % or less of the total amount of the recording layer 23.

In the case where the recording layer 23 is of a write-once type, by setting the thickness of the recording layer 23 to be 5 nm to 70 nm, a sufficient C/N ratio can be obtained. By setting the thickness of the recording layer 23 to be 5 nm or more, sufficient reflectance and reflectance change can be obtained. Furthermore, by setting the thickness of the recording layer 23 to be 70 nm or less, the heat diffusion in the thin film surface of the recording layer 23 can be set to be an appropriate amount, and a satisfactory C/N ratio can be obtained even in high-density recording.

As the material for the reflection layer 26, for example, Au, Ag, Cu, Al, Ni, Pd, Pt, Bi, Sb, Sn, Zn, Cr or an alloy thereof can be used. Furthermore, as the reflection layer 26, a multi-layer film made of a plurality of dielectric layers having different refractive indices may be used.

As the material for the second substrate 12, the same material as that for the first substrate 11 can be used. A material different from that for the first substrate 11 also may be used, and the material for the second substrate 12 may be opaque at the wavelength of the laser beam 14. The thickness of the second substrate 12 is not limited particularly, and can be set in a range of about 0.01 mm to 3.0 mm.

Figure 2:
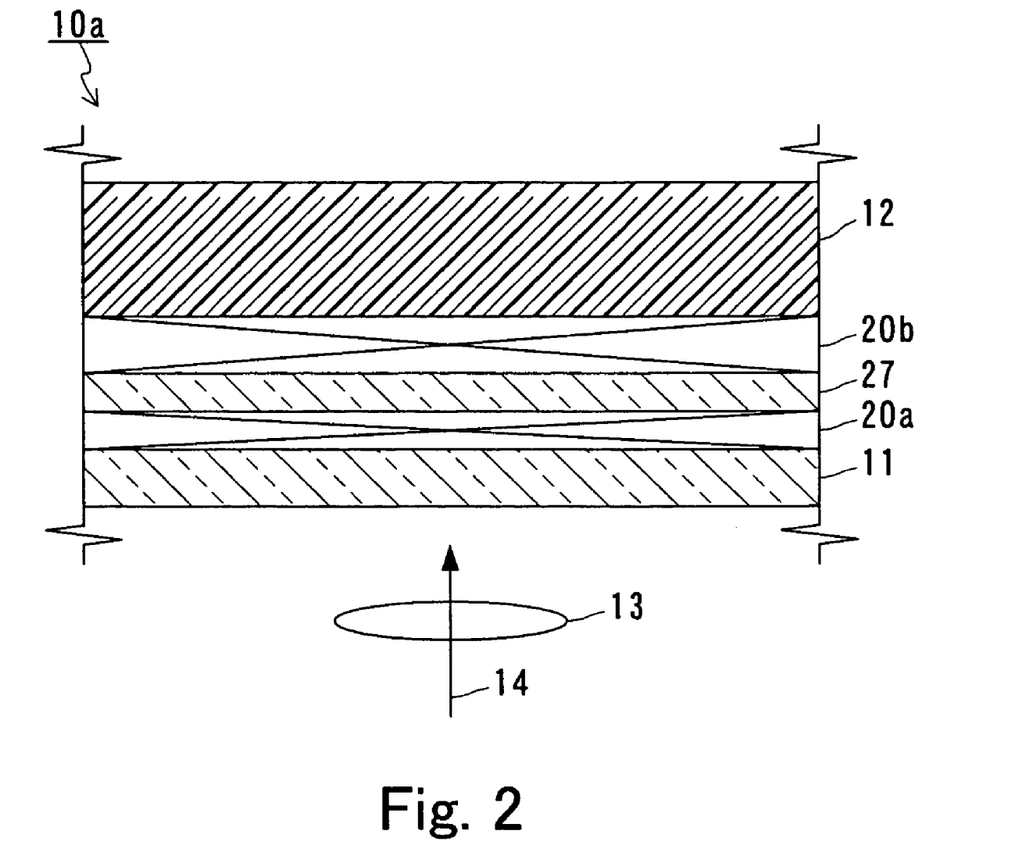
FIG. 2 is a partial cross-sectional view showing another example of the optical information recording medium of the present invention.

Furthermore, the optical information recording medium of the present invention may include at least two information layers between the first substrate 11 and the second substrate 12. FIG. 2 shows a partial cross-sectional view of an optical information recording medium 10a (hereinafter, which may be referred to as a recording medium 10a) including two information layers. In FIG. 2, hatching of a first information layer 20a and a second information layer 20b is omitted.

The recording medium 10a includes the first information layer 20a, a separation layer 27 and the second information layer 20b placed in this order from the first substrate 11 side. At least one information layer stacked via an additional separation layer further may be formed between the second information layer 20b and the second substrate 12. These information layers include a recording layer, respectively, and information is recorded independently. At least one information layer of these information layers has a recording layer 23, a lower side interface layer 22 and/or an upper side interface layer 24 adjacent to the recording layer 23, in the same way as in the information layer 20 shown in FIG. 1. Each information layer is irradiated with the laser beam 14 condensed by the objective lens 13 from the first substrate 11 side, whereby recording/reproducing is performed.

The transmittance of the first information layer 20a is required to be at least about 30%. The first information layer 20a may be of a rewritable type, a write-once type or a read-only type. The second information layer 20b may be of a rewritable type, a write-once type or a read-only type.

The separation layer 27 can be made of UV-curable resin or the like. The thickness of the separation layer 27 is required to be equal to or more than a depth of focus determined at least by the numerical aperture NA of the objective lens 13 and the wavelength λ of the laser beam 14 so that when information is reproduced from either one of the first information layer 20a and the second information layer 20b, crosstalk from the other becomes small. Furthermore, the thickness of the separation layer 27 is required to be in a range in which light can be condensed in all the information layers. For example, in the case where λ=405 nm and NA=0.85, the thickness of the separation layer 27 is required to be in a range of 5 μm to 50 μm.

In the recording medium 10a including two information layers, information can be recorded independently in two information layers, so that the recording density can be doubled.

Furthermore, the following also may be possible: two recording media as described above are prepared, and the respective second substrates 12 are attached to each other, whereby the amount of information that can be accumulated in one medium further can be doubled.

In the optical information recording medium of the present invention, grooves, lands (flat portions between the grooves), or grooves and lands can be used as recording tracks. In the case where the wavelength of laser light used for recording/reproducing is λ and the lens numerical aperture is NA, the recording medium can be increased in density by setting the interval of the recording tracks to be λ/NA or less. In particular, it is preferable that the interval between recording tracks is 0.8 λ/NA or less.

Embodiment 2

In Embodiment 2, a method for producing the optical information recording medium described in Embodiment 1 will be described.

Each layer (excluding the separation layer 27) constituting the information layer of the recording medium can be formed by a general vapor phase deposition method such as vapor deposition, sputtering, ion plating, CVD (Chemical Vapor Deposition), and MBE (Molecular Beam Epitaxy). Furthermore, the separation layer 27 can be formed by a method for applying a UV-curable resin by spin coating and irradiating the resin with UV-light to cure the resin, or by a method for attaching an adhesive sheet.

Hereinafter, a method for forming an interface layer (lower side interface layer 22 and/or upper side interface layer 24) containing a nitride of $Si_xGe_{1-x}$ (where $0.3 \leq x \leq 0.9$) as its main component will be described. The interface layer can be formed by general sputtering or reactive sputtering. In the case of the reactive sputtering, a target containing Si and Ge is sputtered in a sputtering apparatus (in an atmosphere containing inert gas and nitrogen gas) in which at least inert gas and nitrogen gas flow. In the case of the general sputtering, a target containing a nitride of Si and Ge is sputtered in a sputtering apparatus (in an atmosphere containing inert gas) in which at least inert gas flows. In both the cases, by setting the pressure of a sputtering gas to be 0.5 Pa or more, the stress of a layer to be formed can be alleviated. As a result, the tendency for peeling between the recording layer and the interface layer can be reduced. According to this producing method, a recording medium with high environmental reliability such as moisture resistance can be produced.

The recording medium can be produced by stacking the above-mentioned respective layers on the first substrate 11, and forming the second substrate 12 on the information layer or attaching the second substrate 12 to the information layer. Alternatively, the recording medium can be produced by stacking the above-mentioned respective layers on the second substrate 12 and forming the first substrate 11 on the information layer or attaching the first substrate 11 to the information layer. The latter method is suitable in the case where the first substrate 11 is thin (0.4 mm or less). According to the latter method, in the case where an uneven pattern (e.g., grooves for guiding a laser beam or address pits) are formed on the second substrate 12 and the separation layer 27, it is required to use the second substrate 12 and the separation layer 27 with an uneven pattern formed thereon. Such an uneven pattern can be formed by transferring the shape of a stamper with an even pattern formed thereon by an injection method. Furthermore, in the case where it is difficult to form the uneven pattern by the injection method because a substrate and a separation layer to be formed are thin, a 2P method (photo-polymerization method) can be used.

Embodiment 3

In Embodiment 3, a method for recording/reproducing information with respect to the optical information recording medium described in Embodiment 1 will be described.

Figure 3:
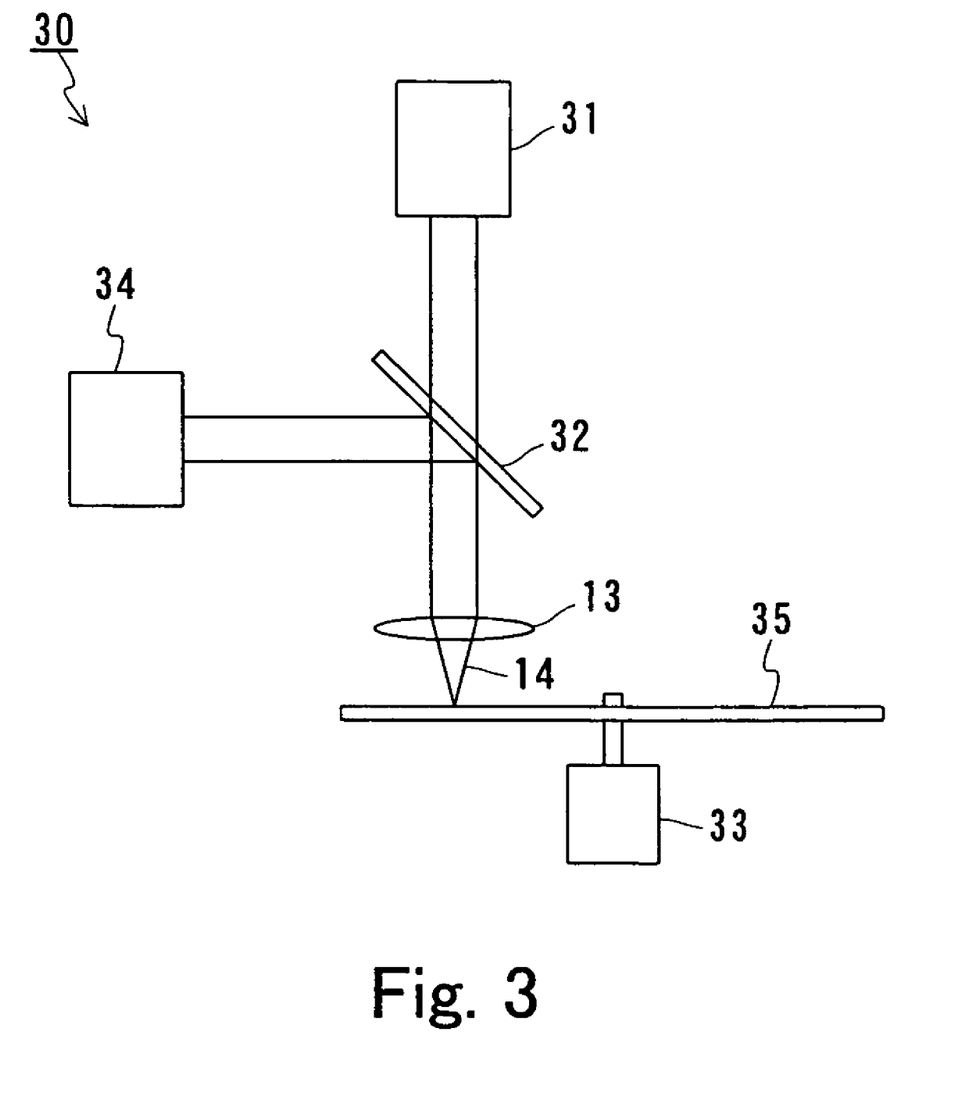
FIG. 3 schematically shows an example of a recording/reproducing apparatus used for recording/reproducing in the optical information recording medium of the present invention.

FIG. 3 schematically shows an exemplary configuration of a recording/reproducing apparatus used in the recording method of the present invention. A recording/reproducing apparatus 30 in FIG. 3 includes a laser diode 31, a half mirror 32, a motor 33, a photodetector 34 and an objective lens 13. In the recording/reproducing apparatus 30, information is recorded/reproduced with respect to the recording medium 35. The recording medium 35 is rotated by the motor 33. The recording medium 35 is the optical information recording medium of the present invention described in Embodiment 1.

The laser beam 14 emitted from the laser diode 31 is transmitted through the half mirror 32 and the objective lens 13 to be focused onto the recording medium 35. Information is recorded by irradiating the recording medium 35 with the laser beam 14 with a particular power. Information is reproduced by irradiating the recording medium 35 with the laser beam 14 of particular power and detecting the light reflected from the recording medium 35 by the photodetector 34.

An information signal is recorded by forming a recording mark on a recording layer. For example, a recording mark is formed by changing the recording layer to a state having different optical characteristics by irradiation with pulse light modulated between a power level P1 and a power level P3 smaller than the power level P1. The intensity of a laser can be modulated easily by modulating a driving current of the laser diode 31. Furthermore, the intensity of a laser also can be modulated by using means such as an electrooptical modulator and an acoustic optical modulator.

Figure 4:
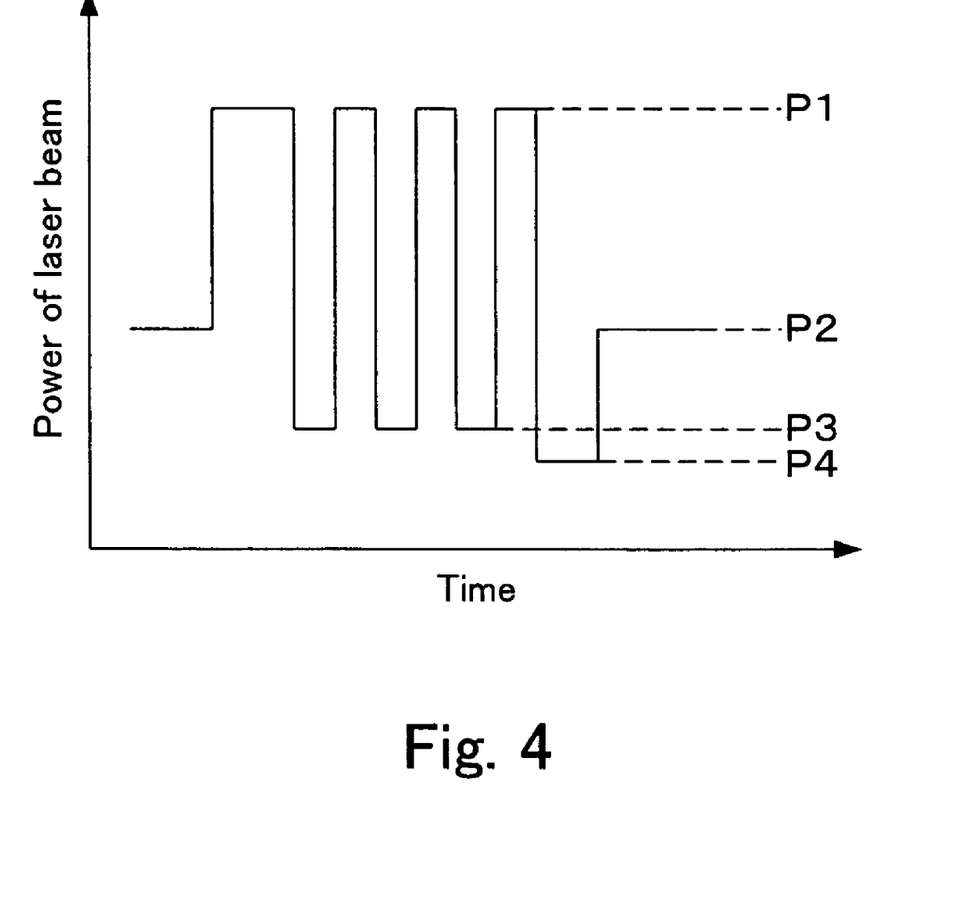
FIG. 4 shows an example of a pulse wavelength of a laser beam used for recording in the optical information recording medium of the present invention.

A recording mark (in an amorphous phase) can be formed by irradiating a portion of the recording layer in a crystal phase with a laser beam having a single rectangular pulse of the peak power P1. However, in the case of forming a long recording mark, it is preferable to use a recording pulse train composed of a plurality of modulated laser pulses so as to prevent overheating and make the width of the recording mark uniform. FIG. 4 shows an example of such a recording pulse train. In FIG. 4, the horizontal axis represents time, and the vertical axis represents a power of a laser beam. In this pulse train, first, a part of the recording layer is irradiated alternately with a laser pulse of a peak power P1 and a laser pulse of a bottom power P3 (P3<P1) to be changed from a crystal phase to an amorphous phase, whereby a recording mark is formed. At the trailing edge of the pulse train, a cooling section for irradiation of a cooling power P4 (P4<P3) may be provided, as shown in FIG. 4. A portion where a recording mark is not to be formed and a portion where a recording mark is to be erased are irradiated with a laser beam (continuous light) kept constant at a bias power P2 (P2<P1). In the case of forming a recording mark, it is preferable that as the recording mark becomes longer, the number of pulses of a laser pulse is increased.

According to the method for recording/reproducing information with respect to the optical information recording medium, recording/reproducing may be performed at a linear velocity varied depending upon a region. When a recording mark is formed using at least two different linear velocities, as the linear velocity becomes higher, each power level preferably is set so as to increase a ratio of P3/P1 or a ratio of P3/P2. Because of this, in the case where a recording medium is stored in a high-temperature environment, a decrease in a signal amplitude of a recording mark and difficulty in erasing a recording mark can be prevented.

Herein, due to the difference in a recording pattern determined by the length of a recording mark, the lengths of spaces before and after the recording mark and the length of an adjacent recording mark, mark edge positions become nonuniform, which may cause an increase in jitter. According to the recording/reproducing method of the present invention, in order to prevent the nonuniformity of mark edge positions to reduce jitter, the position or length of each pulse in the above-mentioned pulse train is adjusted and compensated so that edge positions are aligned on the pattern basis.

In the case of reproducing the information signal thus recorded, a recording medium is irradiated with continuous light of a power level Pr (Pr<P1), light reflected from the recording medium is detected by the photodetector 34, and a change in the amount of reflected light is output as a reproducing signal.

EXAMPLES

Hereinafter, the present invention will be described more specifically by way of examples. The present invention is not limited by the following examples.

Example 1

In Example 1, a recording medium of the present invention including only one information layer will be described. In Example 1, a plurality of samples with a varying ratio of Si and Ge in an interface layer were produced, and evaluated mainly for durability and environment reliability in repeated recording.

The samples were produced as follows. As a protection substrate (second substrate 12), a substrate (diameter: about 12 cm; thickness: about 1.1 mm) made of polycarbonate resin with grooves (groove pitch: 0.32 µm; groove depth: about 20 nm) formed on one side was used.

An information layer was formed, by sputtering, on the surface of the protection substrate with the grooves formed thereon. First, a reflection layer (thickness: about 160 nm) made of Ag—Pd—Cu was formed while Ar gas was allowed to flow, using a target made of Ag—Pd—Cu (atomic ratio: 98:1:1). Then, an upper side interface layer (thickness: about 15 nm) made of Si—Ge—N was formed while Ar and $N_2$ gases were allowed to flow, using a target made of Si—Ge. A recording layer (thickness: about 10 nm) made of Ge—Sb—Te was formed while Ar and $N_2$ gases (flow ratio: 98:2) were allowed to flow, using a target made of Ge—Sb—Te (atomic ratio: 22:23:55). A lower side interface layer (thickness: about 5 nm) made of Si—Ge—N was formed while Ar and $N_2$ gases were allowed to flow, using a target made of Si—Ge. A lower side dielectric layer (thickness: about 55 nm) made of $ZnS$—$SiO_2$ was formed while Ar gas was allowed to flow, using a target made of $ZnS$—$SiO_2$ (mole ratio: 80:20).

A sheet with a diameter of about 12 cm made of polycarbonate resin was attached to the surface of the information layer thus formed via UV-curable resin and was irradiated with UV-light to cure the resin. Thus, a first substrate having a thickness of about 0.1 mm was formed.

In Example 1, in order to change a ratio of Si and Ge in the interface layer, the content of Si in the Si—Ge target was varied as follows: 100 atomic % (elemental Si), 90 atomic %, 80 atomic %, 67 atomic %, 50 atomic %, 33 atomic %, 20 atomic %, 10 atomic %, 0 atomic % (elemental Ge), whereby disks A1, B1, C1, D1, E1, F1, G1, H1 and I1 were produced. The ratio (% by volume) of nitrogen in sputtering gas was minimized so that peeling from the recording layer did not occur in a range where 30 dB or more of erasure ratio, measured by a method described later, was obtained in each Si—Ge composition ratio. Furthermore, the composition of the upper side interface layer was set to be the same as that of the lower side interface layer.

Table 1 shows the content of nitrogen in the optimized sputtering gas and the composition ratio of a target. Table 1 also shows the result obtained by producing a single film of Si—Ge—N under the above condition and measuring the optical constant (refractive index n and extinction coefficient k) at a wavelength of 405 nm.

TABLE 1

| Composition of target | | Content of nitrogen | Optical constant of Si—Ge—N film (wavelength: 405 nm) | |
|---|---|---|---|---|
| Si [at %] | Ge [at %] | (% by volume) | n | k |
| 100 | 0 | 14 | 1.90 | 0.01 |
| 90 | 10 | 18 | 2.03 | 0.02 |
| 80 | 20 | 22 | 2.12 | 0.03 |
| 67 | 33 | 26 | 2.17 | 0.05 |
| 50 | 50 | 30 | 2.33 | 0.07 |
| 33 | 67 | 34 | 2.40 | 0.12 |
| 20 | 80 | 38 | 2.41 | 0.16 |
| 10 | 90 | 40 | 2.44 | 0.17 |
| 0 | 100 | 42 | 2.45 | 0.20 |

As shown in Table 1, as the content of Si in the target was higher, the refractive index n and the extinction coefficient k became small. The atomic ratio between Si and Ge in the interface layer to be formed is essentially the same as that between Si and Ge in the target.

The grooves on each of the above-mentioned disks were irradiated with a laser beam with a wavelength of 405 nm condensed by a lens with a numerical aperture NA of 0.85, whereby single signals of 12.2 MHz and 3.3 MHz were recorded alternately. Recording was performed while the disk was being rotated at a linear velocity of 4.5 m/sec. Recording was performed by irradiation with a rectangular pulse modulated between a peak power P1 and a bias power P2. In the case of recording a signal of 12.2 MHz, a single pulse (pulse width: 13.7 ns) was radiated. In the case of recording a signal of 3.3 MHz, a pulse train composed of a leading pulse (pulse width: 20.5 ns) and subsequent 8 sub-pulses (width: 6.9 ns; interval: 6.9 ns) was radiated. The reproducing power Pr was set to be 0.4 mW.

Under the above condition, the signal of 12.2 MHz and the signal of 3.3 MHz were recorded alternately onto unrecorded tracks ten times in total. Then, a C/N ratio in the case of recording the signal of 12.2 MHz on the resultant disk was measured by a spectrum analyzer. Furthermore, the signal of 3.3 MHz was recorded on the resultant disk, and an erasure ratio, i.e., an extinction ratio of an amplitude of 12.2 MHz was measured by a spectrum analyzer. Measurement was conducted by changing P1 and P2 arbitrarily. P1 was set to be a power that was 1.3 times the power at which the amplitude became lower by 3 dB compared with the maximum, and P2 was set to be the central value in a power range where the erasure ratio exceeded 25 dB.

In any of the disks, the set power of P1 was about 6.2 to 6.8 mW, the set power of P2 was about 2.2 to 2.4 mW, the C/N ratio at these set powers was about 53 to 54 dB, and the erasure ratio was about 30 to 32 dB. These initial characteristics were almost the same in each disk.

Next, in order to check the durability over plural repeated recordings, the signals of 12.2 MHz and 3.3 MHz were repeatedly recorded alternately at the respective set powers with respect to each disk, and the C/N ratio and the erasure ratio were measured in the same way as in the above. Then, the number of recordings where a decrease in a C/N ratio was equal to or less than 1 dB and a decrease in an erasure ratio was equal to or less than 3 dB was defined as the repeatedly recordable number of times. Table 2 shows the result.

TABLE 2

| Disk No. | Composition of target | | Repeatedly recordable number of times | | Time of occurrence of peeling [hour] |
|---|---|---|---|---|---|
| | Si [at %] | Ge [at %] | Wavelength 405 nm | Wavelength 660 nm | |
| A1 | 100 | 0 | 10,000 or more | 10,000 or more | □100 |
| B1 | 90 | 10 | 10,000 or more | 10,000 or more | 200–500 |
| C1 | 80 | 20 | 10,000 or more | 10,000 or more | 500□ |
| D1 | 67 | 33 | 10,000 or more | 10,000 or more | 500□ |
| E1 | 50 | 50 | 10,000 or more | 10,000 or more | 500□ |
| F1 | 33 | 67 | About 5,000 | 10,000 or more | 500□ |
| G1 | 20 | 80 | About 2,000 | 10,000 or more | 200–500 |
| H1 | 10 | 90 | About 800 | 10,000 or more | 200–500 |
| I1 | 0 | 100 | About 300 | 10,000 or more | 200–500 |

Furthermore, 9 kinds of disks with a varying Si—Ge ratio were produced in the same way as in the disks A1 to I1, except that the groove pitch of the substrate was set to be 0.53 μm, the groove depth was set to be 35 nm, the thickness of the ZnS—SiO$_2$ lower side dielectric layer was set to be 140 nm and the thickness of the Si—Ge—N upper side interface layer was set to be 25 nm. Regarding these 9 kinds of disks, the repeatedly recordable number of times was checked under the same condition as the above, except that the wavelength of a laser beam was set to be 660 nm, the frequency of a recording signal was set to be 9.0 MHz and 2.4 MHz and the reproducing power Pr was set to be 0.7 mW. Table 2 shows the result.

Furthermore, in order to check the environment reliability (in particular, moisture resistance) of the disks A1 to I1, the disks were stored for a long period of time in an environment of a temperature of 90° C. and a humidity of 80% RH, whereby the time of the occurrence of peeling was measured. Table 2 also shows the result. In Table 2, "≦100" represents 100 hours or less, "200–500" represents a range of 200 hours to less than 500 hours, and "500 ≦" represents that peeling did not occur even after the elapse of 500 hours or more.

As shown in Table 2, in the disk I1 including the interface layer made of Ge—N, the repeatedly recordable number of times at a wavelength of 405 nm was about several hundred times. However, as the composition ratio of Si was increased, the repeatedly recordable number of times was increased. In the case of Si of 50 atomic % or more, repeated recording of 10,000 times or more was possible. In contrast, the repeatedly recordable number of times was 10,000 or more even in any disk at a wavelength of 660 nm. It was found from this result that each thin film was likely to be thermally damaged when the wavelength became shorter. Furthermore, the durability was enhanced by increasing the composition ratio of Si in the interface layer.

Furthermore, in the disk A1 using the interface layer made of Si—N, peeling occurred within 100 hours. In the disk I1 using the interface layer made of Ge—N, peeling occurred after the elapse of 200 hours. By setting Si and Ge in an appropriate ratio, e.g., setting the ratio of Si to be about 80 to 30 atomic %, the moisture resistance was enhanced remarkably, and stable moisture resistance was exhibited over 500 hours or more.

As described above, by using an inorganic layer containing a nitride of $Si_xGe_{1-x}$ (where $0.3 \leq x \leq 0.9$) as its main component, an optical information recording medium excellent in durability in repeated recording using violet laser light and environment reliability was obtained.

Example 2

In Example 2, the optical information recording medium of the present invention including a plurality of information layers will be described. In Example 2, a plurality of samples with a various ratio of Si and Ge in an interface layer were produced, and evaluated mainly for transmittance and recording sensitivity.

The samples were produced as follows. As a protection substrate (second substrate 12), a substrate (diameter: about 12 cm; thickness: about 1.1 mm) made of polycarbonate resin with grooves (groove pitch: 0.32 μm; groove depth: about 20 nm) formed on one side was used.

A second information layer was formed by sputtering on the surface of the protection substrate with the grooves formed thereon. First, a reflection layer (thickness: about 160 nm) made of Ag—Pd—Cu was formed while Ar gas was allowed to flow, using a target made of Ag—Pd—Cu (atomic ratio: 98:1:1). Then, a reflection layer (thickness: about 10 nm) made of Al—Cr was formed while Ar gas was allowed to flow, using a target made of Al—Cr (atomic ratio: 98:2). An upper side dielectric layer (thickness: about 15 nm) made of ZnS—SiO$_2$ was formed while Ar gas was allowed to flow, using a target made of ZnS—SiO$^2$ (mole ratio: 80:20). An upper side interface layer (thickness: about 5 nm) made of Si—Ge—N was formed while Ar and N$_2$ gases were allowed to flow, using a target made of Si—Ge. A recording layer (thickness: about 12 nm) made of Ge—Sb—Te was formed while Ar and $N_2$ gases (flow ratio: 98:2) were allowed to flow, using a target made of Ge—Sb—Te (atomic ratio: 22:23:55). A lower side interface layer (thickness: about 5 nm) made of Si—Ge—N was formed while Ar and $N_2$ gases were allowed to flow, using a target made of Si—Ge. A lower side dielectric layer (thickness: about 50 nm) made of ZnS—$SiO_2$ was formed while Ar gas was allowed to flow, using a target made of ZnS—$SiO_2$ (mole ratio: 80:20).

The surface of the information layer thus formed was coated with UV-curable resin, and the same groove pattern as that on the protection substrate was transferred to the surface coated with UV-resin by the above-mentioned 2P method. Thus, a separation layer (thickness: about 20 μm) with the grooves formed on the surface was formed.

A first information layer was formed by sputtering on the surface of the separation layer. First, a reflection layer (thickness: about 10 nm) made of Ag—Pd—Cu was formed while Ar gas was allowed to flow, using a target made of Ag—Pd—Cu (atomic ratio: 98:1:1). Then, an upper side interface layer (thickness: about 10 nm) made of Si—Ge—N was formed while Ar and $N_2$ gases were allowed to flow, using a target made of Si—Ge. A recording layer (thickness: about 6 nm) made of Ge—Sb—Te was formed while Ar and $N_2$ gases (flow ratio: 98:2) were allowed to flow, using a target made of Ge—Sb—Te (atomic ratio: 22:23:55). A lower side interface layer (thickness: about 5 nm) made of Si—Ge—N was formed while Ar and $N_2$ gases were allowed to flow, using a target made of Si—Ge. A lower side dielectric layer (thickness: about 45 nm) made of ZnS—$SiO_2$ was formed while Ar gas was allowed to flow, using a target made of ZnS—$SiO_2$ (mole ratio: 80:20).

A sheet with a diameter of about 12 cm made of polycarbonate resin was attached to the surface of the first information layer thus formed via UV-curable resin and was irradiated with UV-light to cure the resin. Thus, a transparent substrate (first substrate) having a thickness of about 0.09 mm was formed.

In Example 2, in order to change a ratio of Si and Ge in the interface layer, the content of Si in the Si—Ge target was varied as follows: 100 atomic % (elemental Si), 90 atomic %, 80 atomic %, 67 atomic %, 50 atomic %, 33 atomic %, 20 atomic %, 10 atomic %, 0 atomic % (elemental Ge), whereby disks A2, B2, C2, D2, E2, F2, G2, H2 and I2 were produced. The concentration of nitrogen in sputtering gas was set to be the same as that in Example 1. Furthermore, in each information layer, the composition of the upper side interface layer was set to be the same as that of the lower side interface layer.

Herein, in order to check the transmittance of the first information layer in each disk, a multi-layer film having the same configuration as that of the first information layer was formed on a quartz substrate, and the transmittance was measured by a spectroscope. Table 3 shows the transmittance at a wavelength of 405 nm.

TABLE 3

| Disk No. | Composition of target | | Transmittance of first information layer [%] | Set power of second information layer | |
|---|---|---|---|---|---|
| | Si [at %] | Ge [at %] | | P1 [mW] | P2 [mW] |
| A2 | 100 | 0 | 50 | 10.2 | 3.4 |
| B2 | 90 | 10 | 48 | 10.5 | 3.5 |
| C2 | 80 | 20 | 47 | 11.1 | 3.7 |
| D2 | 67 | 33 | 46 | 11.4 | 3.8 |
| E2 | 50 | 50 | 45 | 11.9 | 4.0 |
| F2 | 33 | 67 | 44 | 12.7 | 4.2 |
| G2 | 20 | 80 | 42 | 13.5 | 4.5 |
| H2 | 10 | 90 | 41 | 14.9 | 5.0 |
| I2 | 0 | 100 | 40 | 15.5 | 5.2 |

As shown in Table 3, as the composition ratio of Si was larger, the transmittance of the first information layer was higher, which reflected the values of the extinction coefficient k shown in Table 1.

The grooves on the first and second information layers of each of the above-mentioned disks were irradiated with a laser beam with a wavelength of 405 nm condensed by a lens with a numerical aperture NA of 0.85, whereby single signals of 12.2 MHz and 3.3 MHz were recorded alternately. Recording was performed while the disk was being rotated at a linear velocity of 5 m/sec. Recording was performed by irradiation with a rectangular pulse modulated between a peak power P1 and a bias power P2. In the case of recording a signal of 12.2 MHz, a single pulse (pulse width: 13.7 ns) was used. In the case of recording a signal of 3.3 MHz, a pulse train composed of a leading pulse (pulse width: 20.5 ns) and subsequent 8 sub-pulses (width: 6.9 ns; interval: 6.9 ns) was used. The reproducing power Pr was set to be 0.7 mW.

Under the above condition, the signal of 12.2 MHz and the signal of 3.3 MHz were recorded alternately onto unrecorded tracks ten times in total. Then, a C/N ratio in the case of recording the signal of 12.2 MHz on the resultant disk was measured by a spectrum analyzer. Furthermore, the signal of 3.3 MHz was recorded on the resultant disk, and an erasure ratio, i.e., an extinction ratio of an amplitude of 12.2 MHz was measured by a spectrum analyzer. Measurement was conducted by changing P1 and P2 arbitrarily. P1 was set to be a power that was 1.3 times the power at which the amplitude became lower by 3 dB compared with the maximum, and P2 was set to be the central value in a power range where the erasure ratio exceeded 25 dB.

In the first information layer of any of the disks, the set power of P1 was about 8.8 to 9.4 mW, the set power of P2 was about 3.4 to 3.6 mW, the C/N ratio at these set powers was about 52 to 53 dB, and the erasure ratio was about 30 to 32 dB. These initial characteristics were almost the same in each disk.

In the second information layer, the C/N ratio at the set powers was about 53 to 54 dB, and the erasure ratio was about 30 to 32 dB, which were almost the same in each disk. However, the set powers of P1 and P2 in the second information layer were varied depending upon the disk. Table 3 shows the set power in the second information layer.

As shown in Table 3, in the disk I2 using the interface layer made of Ge—N, the set power of P1 in the second information layer was 15 mW or more. The set power of P1 was decreased as the composition ratio of Si was increased. When the composition ratio of Si was 50 atomic % or more, the set power of P1 was 12 mW or less.

Thus, in the case of recording information with respect to a recording medium including a plurality of information layers with violet laser light, by using an inorganic layer containing a nitride of $Si_xGe_{1-x}$ (where $0.3 \leq x \leq 0.9$) as its main component, recording can be performed with light of lower power.

INDUSTRIAL APPLICABILITY

As described above, according to the present invention, an optical information recording medium capable of recording/reproducing information with satisfactory reliability even in recording/reproducing with light beam having a short wavelength or in recording/reproducing with respect to a plurality of information layers, and a recording method using the same. The present invention is applicable to various optical information recording media.

This invention claimed is:

1. An optical information recording medium, comprising:
   a first substrate;
   a second substrate disposed in parallel with the first substrate;
   a first information layer disposed between the first substrate and the second substrate; and
   a second information layer disposed between the first information layer and the second substrate,
   wherein the first information layer comprises a phase-change recording layer and an inorganic layer directly adjacent to the phase-change recording layer,
   the phase-change recording layer is changed between at least two different states, which are discernable optically, by irradiation with a light beam incident from the first substrate side,
   the phase-change recording layer is made of an alloy containing Te and Sb, and
   the inorganic layer contains a nitride of $Si_xGe_{1-x}$ (where $0.3 \leq x \leq 0.9$) as a main component.

2. An optical information recording medium according to claim 1, wherein the phase-change recording layer is changed reversibly between the at least two different states, which are discernable optically, by irradiation with the light beam.

3. An optical information recording medium according to claim 1, wherein the phase-change recording layer is changed between the different states by a light beam with a wavelength of 500 nm or less.

4. An optical information recording medium according to claim 1, wherein the first information layer includes a reflection layer disposed on the second substrate side with respect to the phase-change recording layer.

5. An optical information recording medium according to claim 1, wherein a thickness of the phase-change recording layer is 18 nm or less.

6. An optical information recording medium according to claim 1, wherein the phase-change recording layer is made of a Ge—Sb—Te based alloy, a Ge—Sn—Sb—Te based alloy, an Ag—In—Sb—Te based alloy or an Ag—In—Ge—Sb—Te based alloy.

7. An optical information recording medium according to claim 1, wherein the phase-change recording layer is made of a Ge—Sb—Te based alloy, and the alloy contains Ge in a content of 30 atomic % or more.

8. An optical information recording medium according to claim 1, wherein the phase-change recording layer is made of a Ge—Sn—Sb—Te based alloy, and the alloy contains Ge and Sn in a content of 30 atomic % or more in total.

* * * * *